Dec. 8, 1936.  C. H. RANDOLPH  2,063,269
ELEMENTARY MUSIC NOTATION DEVICE
Filed Jan. 24, 1936
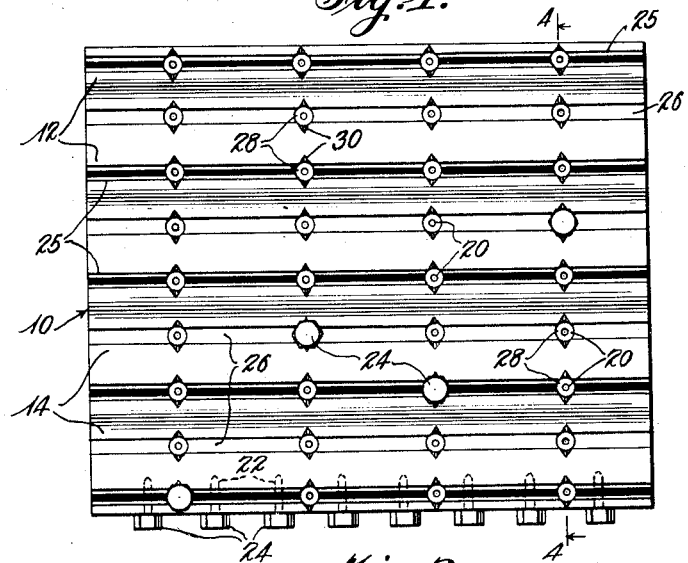
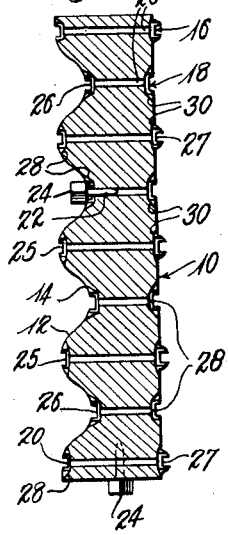
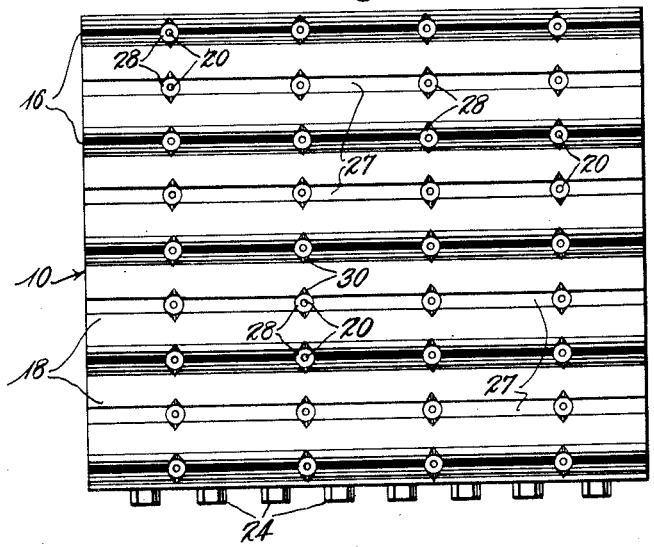
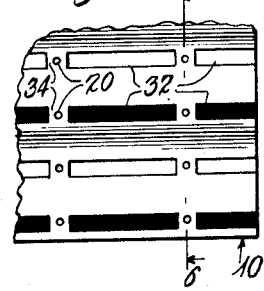
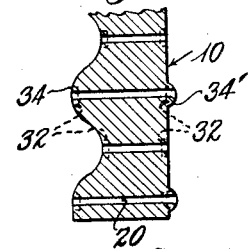
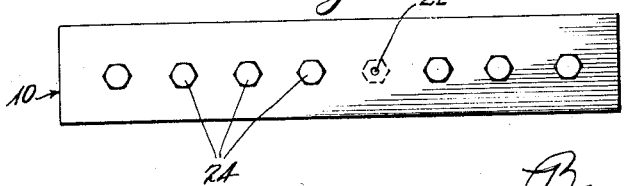
Inventor
Cary H. Randolph
By Bacon & Thomas
Attorneys Patented Dec. 8, 1936

2,063,269

UNITED STATES PATENT OFFICE 2,063,269

ELEMENTARY MUSIC NOTATION DEVICE

Cary H. Randolph, St. Louis, Mo.

Application January 24, 1936, Serial No. 60,669

5 Claims. (Cl. 84—471)

The present application is a continuation-in-part of my copending application Serial No. 708,866, filed January 29, 1934.

This invention relates to an elementary music notation device and more particularly to improvements over the subject matter of my earlier Patent No. 1,450,868, issued April 3, 1923.

An object of the invention is to provide a body having substantially flat and corrugated opposite faces, the latter face comprising alternate parallel ridges and valleys, the ridges being lined to represent the lines of a music staff and the valleys representing the spaces between the lines. The opposite flat face also bears lines to represent a music staff, said lines having a slight elevation beneath them, and the lines and spaces of both faces are provided with sockets adapted to removably receive headed stems simulating note symbols. The entire device is adapted to facilitate instruction in music to enable a beginner to read notes by emphasizing the spaces as well as the lines of the staff and using the sense of touch as well as the sense of sight.

Another object of the invention is to provide means for more readily locating the socketed area of the body and further to provide means for facilitating the insertion of the headed stems into the sockets where desired. The foregoing means may be responsive to either the touch or sight or both.

A further object is to provide the front edge of the body with a container for conveniently receiving the headed stems when the same are not used in connection with the simulated music staff faces of the body.

In the accompanying drawing, wherein similar reference characters indicate corresponding parts throughout the several views thereof:

Figure 1 is a plan view of the front or corrugated face of a device constructed in accordance with the invention;

Figure 2 is a plan view of the rear or flat face of the device;

Figure 3 is a plan view of the front edge of the device showing the container with the headed stems stored therein;

Figure 4 is a section on line 4—4 of Figure 1;

Figure 5 is an enlarged fragmentary plan view of the corrugated face of a slightly modified device; and Figure 6 is a sectional view on the line 6—6 of Figure 5.

Referring to the drawing in detail, particularly Figure 1, the block or body 10, preferably made from wood although it may be made from any other suitable material and of any desired shape and size, has formed in its front or corrugated face a plurality of ridges 12 and valleys 14 therebetween, the ridges being arranged in spaced parallel relation to each other longitudinally of the body 10, which latter is preferably rectangular, as shown. The apex of each ridge 12 is disposed in a common plane to the other ridges, and each apex carries a stripe to constitute a line of a music staff, which stripe is preferably black or any other distinguishable hue. The valleys 14 between the ridges 12 are also colored a distinguishable hue different from that of the lines on the ridges and are preferably white.

The rear or flat face of the body 10, as shown in Figure 2, is provided with similar stripes 16 to constitute the lines of a music staff, and also similarly the spaces 18 between the lines 16 are colored a distinguishable hue to constitute the spaces of a music staff.

Each face of the device along the lines and spaces thereof is provided at intervals with sockets 20 which are adapted to receive headed stems 22, the heads 24 of which are intended to represent note symbols which may be selectively accommodated in the sockets to represent any desired bar or line of music. In the preferred embodiment of the invention, the lined portion of the corrugated face and the spaces intermediate the lines are provided with continuous channels or grooves 25 and 26 respectively which intersect the sockets 20 and constitute a means for readily locating the lines and spaces on the faces of the body 10 by touch in addition to sight. The opposite or flat face likewise has the spaces thereof provided with channels or grooves 27. The lined portion 16 may also be similarly channeled but preferably is slightly elevated to facilitate its location by touch.

The stem heads 24 are preferably provided with squared corners or may be shaped in any other form to enable the user of the device to more easily grasp the heads with the fingers for inserting the stems into or removing the same from the sockets. As shown in Figure 3, an edge of the body 10, preferably the front edge thereof, is provided with a series of additional sockets 21 which comprise a container intended to receive the headed stems and to store the same when they are not used as note symbols on the faces of the device.

A novel feature of the present invention comprises the provision of means to facilitate the insertion of headed stems 22 in the sockets 20, which means comprises a recessed or indented area 28 at each of the sockets whereby the sockets may be readily located by touch and the stems readily inserted therein. A further means for emphasizing sockets 20, which may be used either in lieu of or, preferably, in conjunction with the indentations 28, consists of an area adjacent the sockets colored a distinguishable hue, preferably red, which is represented by numeral 30 in Figures 1 and 2 of the drawing. The colored area 30 enables the student to locate the sockets by sight in addition to touch, and while the areas are represented in the drawing as of substantially triangular shape, it is understood that this is exemplary only as these areas may be of any other desired shape and, for example, may comprise circles or squares disposed around the sockets 20 or numerals or letters of the alphabet.

In the modified forms of the invention of Figures 5 and 6, the continuous grooves 25, 26, and 27 of the preferred embodiment are replaced by broken grooves 32, the broken area of the grooves 32 being adjacent the sockets 20 to provide a portion 34 raised with respect to the groove or raised areas 34' generally may be provided adjacent each of the sockets to serve as guide means for the stems 22 in place of the indented or recessed guide means 28 of the preferred embodiment. Although not shown in Figure 5, the raised areas 34 therein may bear a color of distinguishable hue for further attracting attention to the socket, as described above. It is understood that this invention comprehends broadly the provision of recessed or raised areas for socket guides as well as line and space guides in a device of the character described and is not intended to be limited to the specific shapes or forms exemplified in the drawing.

Having thus described the invention, what I claim is:

1. A device of the character described, comprising a body having a face thereof lined to represent a music staff, said lined portions and the spaces intermediate the lined portions having parallel surfaces contrasting in elevation whereby the lines and spaces may be located by touch, spaced sockets in said lines and spaces, the surface adjacent the mouth of said sockets contrasting in elevation with the adjoining surface thereby to provide touch responsive means for locating the sockets and headed stems selectively engageable in said sockets for representations of note symbols.

2. A device of the character described, comprising a body having a face thereof lined to represent a music staff, said lined portions and the spaces intermediate the lined portions having parallel surfaces contrasting in elevation whereby the lines and spaces may be located by touch, spaced sockets in said lines and spaces, the surface adjacent the mouth of said sockets contrasting in color and elevation with the adjoining surface thereby to provide sight and touch responsive means for locating the sockets and headed stems selectively engageable in said sockets for representations of note symbols.

3. A device of the character described, comprising a body having a face thereof lined to represent a music staff, said lined portions and the spaces intermediate the lined portions having parallel surfaces contrasting in elevation whereby the lines and spaces may be located by touch, spaced sockets in said lines and spaces, the surface adjacent the mouth of said sockets being indented with respect to the adjoining surface, thereby to provide touch responsive means for locating the sockets, and headed stems selectively engageable in said sockets for representations of note symbols.

4. A device of the character described, comprising a body having a face thereof lined to represent a music staff, said lined portions and the spaces intermediate the lined portions having parallel surfaces contrasting in elevation whereby the lines and spaces may be located by touch, spaced sockets in said lines and spaces, the surface adjacent the mouth of said sockets being elevated with respect to the adjoining surface thereby to provide touch responsive means for locating the sockets, and headed stems selectively engageable in said sockets for representations of note symbols.

5. A device of the character described comprising a body having a face thereof lined to represent a music staff, the spaces intermediate the lines being parallelly grooved to provide a series of parallel surfaces on the face contrasting in elevation, spaced sockets in said lines and spaces, the surface adjacent the mouth of said sockets contrasting in elevation with the adjoining surface thereby to provide touch responsive means for locating the sockets and headed stems selectively engageable in said sockets for representations of note symbols.

CARY H. RANDOLPH.